(12) United States Patent
Tame

(10) Patent No.: US 7,086,697 B2
(45) Date of Patent: Aug. 8, 2006

(54) VEHICLE SEAT RECLINER HAVING A SLIDING PAWL

(76) Inventor: Omar D. Tame, 4059 Green Lake Rd., West Bloomfield, MI (US) 48324

( * ) Notice: Subject to any disclaimer, the term of this patent is extended or adjusted under 35 U.S.C. 154(b) by 0 days.

(21) Appl. No.: 10/470,864

(22) PCT Filed: Feb. 1, 2002

(86) PCT No.: PCT/US02/02830

§ 371 (c)(1),
(2), (4) Date: Jan. 12, 2004

(87) PCT Pub. No.: WO02/060718

PCT Pub. Date: Aug. 8, 2002

(65) Prior Publication Data

US 2004/0113478 A1 Jun. 17, 2004

Related U.S. Application Data

(60) Provisional application No. 60/265,943, filed on Feb. 1, 2001.

(51) Int. Cl.
*B60N 2/22* (2006.01)

(52) U.S. Cl. .................. 297/367; 297/378.12; 297/370
(58) Field of Classification Search ................ 297/367, 297/378.12

See application file for complete search history.

(56) References Cited

U.S. PATENT DOCUMENTS

| 3,788,698 A | 1/1974 | Perkins |
| 4,561,207 A | 12/1985 | Novak |
| 4,629,252 A | 12/1986 | Myers et al. |
| 4,659,146 A | 4/1987 | Janiaud |
| 4,875,735 A | 10/1989 | Moyer et al. |
| 5,154,476 A | 10/1992 | Haider et al. |
| 5,433,507 A | 7/1995 | Chang |
| 5,622,410 A | 4/1997 | Robinson |
| 5,722,730 A | 3/1998 | McKernan |
| 5,733,008 A | 3/1998 | Tame |
| 5,749,625 A | 5/1998 | Robinson |
| 5,762,400 A * | 6/1998 | Okazaki et al. ............. 297/367 |
| 6,139,104 A | 10/2000 | Brewer |
| 6,209,955 B1 | 4/2001 | Seibold |
| 6,318,805 B1 * | 11/2001 | Asano ........................ 297/367 |
| 6,328,382 B1 * | 12/2001 | Yamashita .................. 297/367 |

FOREIGN PATENT DOCUMENTS

| DE | 2019707 | 4/1970 |
| DE | 29 31 873 A1 | 8/1979 |
| EP | 0 758 592 B1 | 8/1995 |
| FR | 2 215 109 | 1/1973 |
| FR | 2 277 550 | 7/1974 |
| WO | WO 00/06414 | 7/1998 |

* cited by examiner

*Primary Examiner*—Anthony D. Barfield
(74) *Attorney, Agent, or Firm*—Clark Hill PLC

(57) ABSTRACT

A recliner mechanism for an automotive vehicle seat for allowing pivotal adjustment of a seat back (12) relative to a seat cushion (14) between a plurality of reclined seating positions and a forwardly stowed position. The recliner mechanism includes a seat back (12) bracket pivotally coupled to a seat cushion bracket. The seat back (12) bracket and seat cushion (14) bracket are each fixedly secured to the seat back (12) and seat cushion (14), respectively. A sector of teeth is formed in the seat back bracket. A pawl (40) having a rack of teeth lockably engageable with the sector of teeth is slidably engaged with the seat cushion bracket (30) for movement between a locked position with the rack of teeth engaged with the sector of teeth and an unlocked position with the rack of teeth disengaged with the sector of teeth. A guide pin (26) extends from the seat hack bracket (20) to maintain the pawl (40) in the unlocked position while the seat back is moved between the plurality of reclined seating positions and the forwardly stowed position.

10 Claims, 5 Drawing Sheets

VEHICLE SEAT RECLINER HAVING A SLIDING PAWL

RELATED APPLICATION

This application claims priority to and all the benefits of U.S. Provisional Application No. 60/265,943, filed on Feb. 1, 2001.

BACKGROUND OF THE INVENTION

1. Field of the Invention

The present invention relates to a recliner mechanism for a seat assembly of an automotive vehicle allowing pivotal adjustment of a seat back relative to a seat cushion between a plurality of reclined seating positions, and more particularly, to a sliding pawl in the recliner mechanism moveable in and out of engagement with a sector formed in the seat back for selectively locking the seat back in one of the reclined positions.

2. Description of the Prior Art

Automotive vehicles include seat assemblies for supporting occupants within the vehicles. Typically, a seat assembly includes a seat cushion and a seat back. The seat back is usually operatively interconnected to the seat cushion by a recliner mechanism. The recliner mechanism allows for pivotal adjustment of the seat back relative to the seat cushion between a plurality of reclined seating positions. It is also common for a recliner mechanism to allow pivotal adjustment of the seat back between one of the reclined seating positions and a stowed position. An example of such a recliner mechanism is shown in PCT application CA 99/00653, published Feb. 10, 2000. However, it is often desired to utilize a less complex and more compact design.

Accordingly, it remains desirable to provide a simple recliner mechanism providing similar seat function and improved packageability to more complex designs.

SUMMARY OF THE INVENTION

According to one aspect of the invention there is provided a recliner mechanism for an automotive vehicle seat for allowing pivotal adjustment of a seat back relative to a seat cushion. The recliner mechanism includes a seat back bracket adapted to be fixedly secured to the seat back and having a sector teeth. The recliner mechanism also includes a seat cushion bracket adapted to be fixedly secured to the seat cushion. The seat cushion bracket is pivotally assembled to said seat back bracket for movement of the seat back bracket between a plurality of seating positions. The seat cushion bracket has spaced apart guide walls defining a channel therebetween. The recliner mechanism, further, includes a pawl having a rack of teeth lockably engagable with the sector of teeth. The pawl is slidably engaged within the channel for movement between a locked position with the rack of teeth lockably engaged with the sector of teeth to maintain the angular position of the seat back bracket relative to the seat cushion bracket and an unlocked position with the rack of teeth disengaged from the sector of teeth to allow pivotal movement of the seat back bracket relative to the seat cushion bracket between the plurality of seating positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
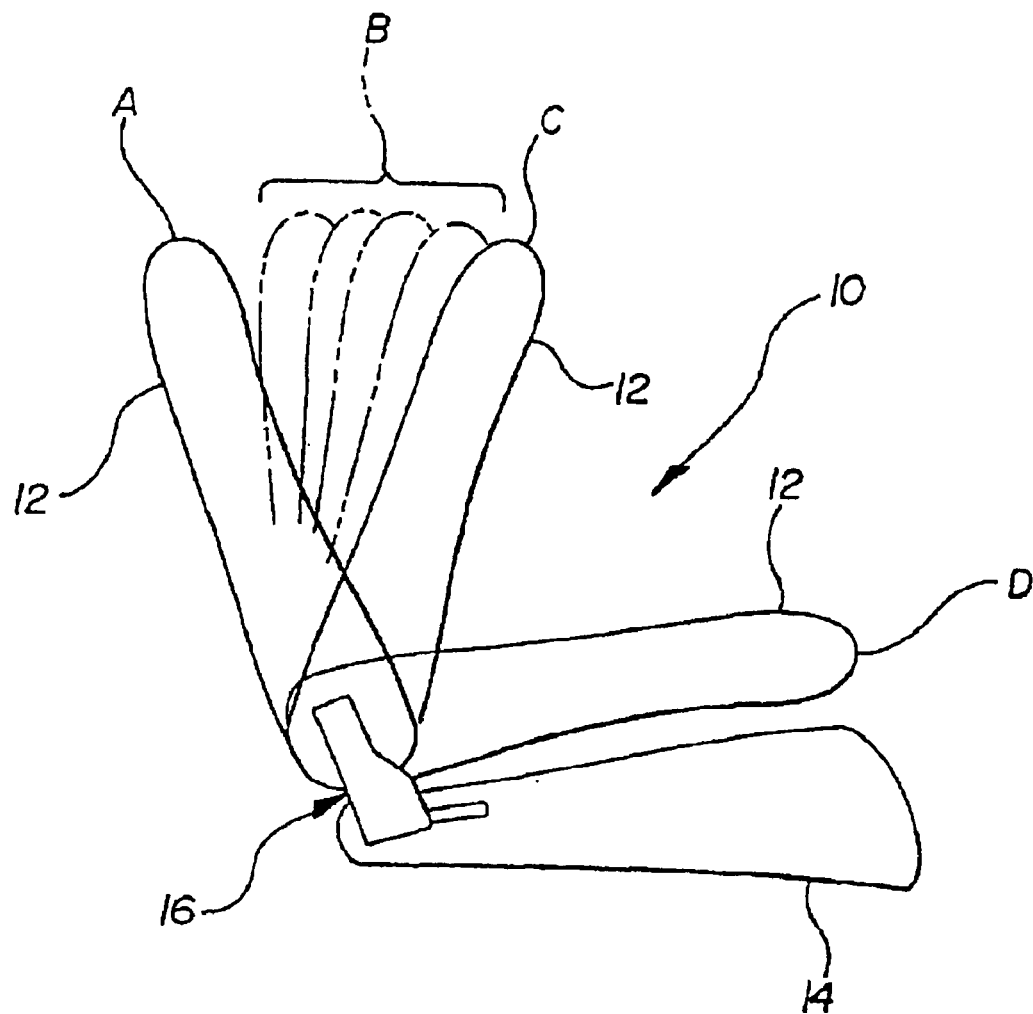
FIG. 1 is a schematic view of a seat assembly having a seat back and a seat cushion, and incorporating a recliner mechanism according to the present invention.

Referring to the figures, FIG. 1 shows a seat assembly 10 comprising a seat back 12 and a seat cushion 14. The seat back 12 is pivotally assembled to the seat cushion 14 by a recliner mechanism 16. Described in greater detail below, the recliner mechanism 16 allows for angular or pivotal adjustment of the seat back 12 relative to the seat cushion 14 between a fully reclined seating position A, a full forward reclined seating positions C, and a plurality of reclined seating positions B, therebetween. The recliner mechanism 16 further allows the seat back 12 to be adjusted between one of the reclined seating positions A, B, C and a stowed position D.

Figure 2:
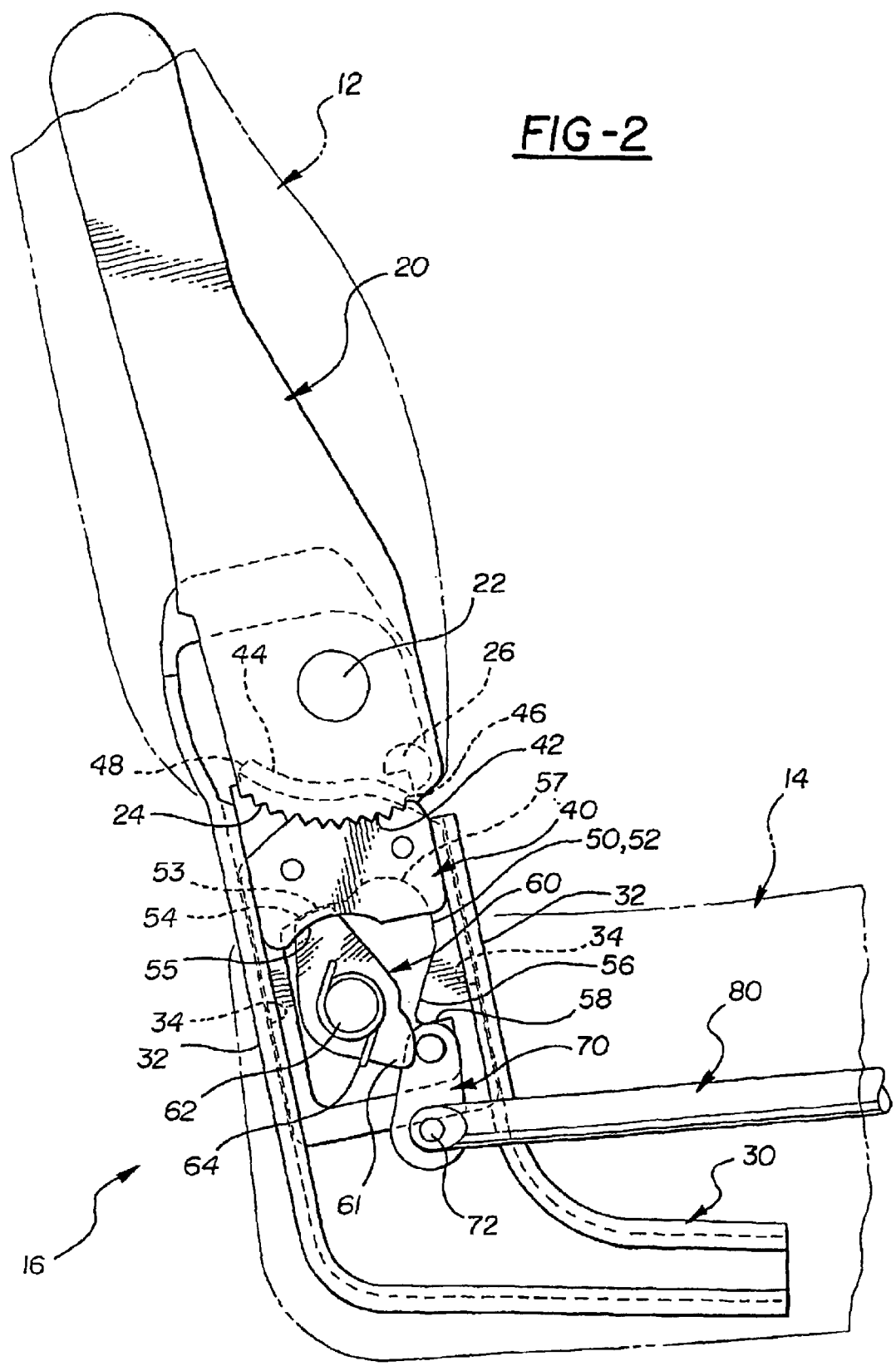
FIG. 2 is a side view of the recliner mechanism shown in a locked position with the seat back in one of a plurality of reclined seating positions.
Figure 3:
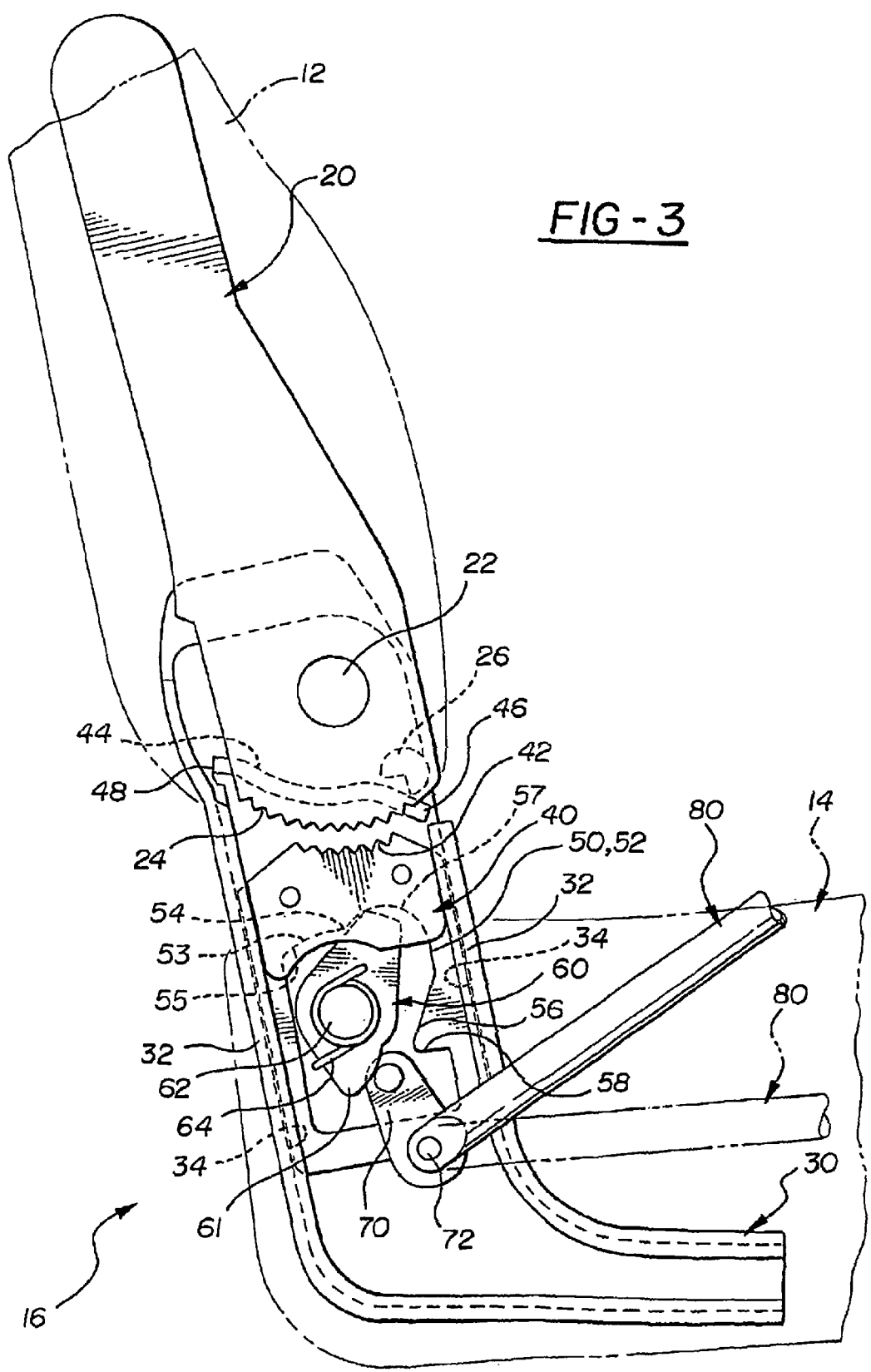
FIG. 3 is a side view of the recliner mechanism shown in an unlocked position.

Referring to FIG. 2, the seat back 12 includes a seat back bracket 20 and the seat cushion 14 includes a cushion bracket 30. A pivot pin 22 pivotally interconnects the seat back and cushion brackets 20, 30 allowing for pivotal movement of the seat back 12 relative to the seat cushion 14. The recliner mechanism 16 includes a sector of teeth 24 formed in the seat back bracket 20 and centered about the pivot pin 22. Generally parallel and spaced apart guide walls 32 are formed in the cushion bracket 30 defining a channel 34. The recliner mechanism 16 further includes a pawl 40 having a rack of teeth 42 adapted for locking engagement with the sector of teeth 24. The pawl 40 is slidably nested within the channel 34 for movement between a locked position with the rack of teeth 42 lockingly engaged with the sector of teeth 24 of the seat back bracket 20, as shown in FIG. 2, and an unlocked position with the rack of teeth 42 disengaged with the sector of teeth 24, as shown in FIG. 3. With the pawl 40 in the locked position, the angular position of the seat back 12 relative to the seat cushion 14 is maintained; in the unlocked position, the seat back 12 is freely moveable about the pivot pin 22 relative to the seat cushion 14.

Referring to FIGS. 1 and 2, the pawl 40 includes a first cam edge 44 having a raised profile to be engagable with the seat back bracket 20 during pivotal movement of the seat back 12. More specifically, a guide pin 26 extends from the seat back bracket 20 to slidably engage the first cam edge 44 during movement of the seat back 12 between the full forward seating position C and the stowed position D. The guide pin 26 transfers the motion of the seat back 12 to the pawl 40 via contact with the first cam edge 44 to displace the pawl 40 along the channel 34 between the locked and unlocked positions. The first cam edge 44 extends between fore and aft ends 46, 48. When the seat back 12 reaches either the full forward reclined seating position C or the stowed position D, the guide pin 26 slides past the first cam edge 44 and abuts either the fore or aft end 46, 48, respectively, to allow the pawl 40 to return to the locked position. A generally rectangular opening 50 framed by a peripheral edge 52 is formed in the pawl 40. A second cam edge 54 opposite of and spaced apart from the first cam edge 44 is formed by a portion of the peripheral edge 52. The second cam edge 54 has a curved profile including a raised portion 53 and a concave portion 57 adjacent the raised portion 53. A locking peninsula or tab 56 formed in the pawl 40 extends inwardly to present a locking edge 58 opposite of the first cam edge 44.

A cam 60 is rotatably assembled to the seat cushion 14 by a pivot pin 62 for selectively engaging the second cam edge 54. The cam 60 is rotatable between a locked position engaged with the raised portion 53, as shown in FIG. 2, and an unlocked position extending into the concave portion 57, as shown in FIG. 3. In the locked position, the cam 60 acts upon the raised portion 53 of the second cam edge 54 to force the pawl 40 into the respective locked position. The cam 60 projects into the concave portion 57 to allow the pawl 40 to move towards the respective unlocked position with the rack of teeth 42 disengaged from the sector of teeth 24. The cam 60 is biased in the locked position by any suitable biasing element 64, such as a helical spring compressed between the seat cushion bracket 30 and the cam 60. A plurality of concavities 55 is formed along the second cam edge 54 to minimize contact, and thus friction, between the cam 60 and the pawl 40 during actuation of the cam 60 between its locked and unlocked positions. The cam 60 further includes a tab or arm 61 extending radially outwardly from pivot pin 62 to facilitate manual actuation of the cam 60 between the locked and unlocked positions.

Figure 5:
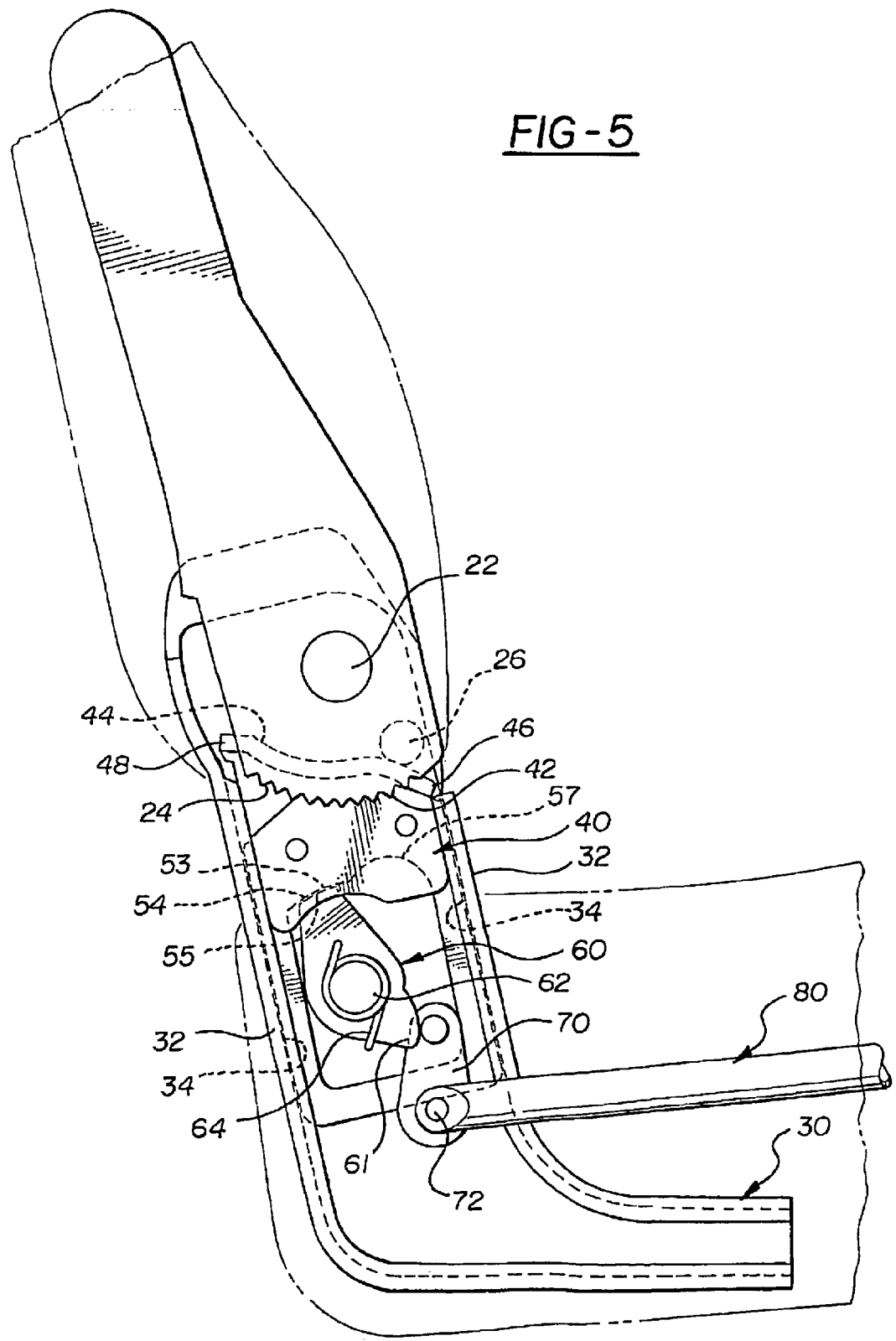
FIG. 5 is a side view of the recliner mechanism, according to an alternate embodiment of the invention, shown in the locked position with the seat back in one of the reclined seating positions.

A trigger arm 70 is pivotally assembled to the seat cushion bracket 30 by a pivot pin 72 for movement between a locked position, shown in FIG. 2, and an unlocked position engaged with the arm 61 of the cam 60, as shown in FIG. 3. In the locked position, the trigger arm 70 abuts the locking edge 58 and is presented for engagement with the cam 60. Both the trigger arm 70 and the cam 60, while in their respective locked positions, hold the rack of teeth 42 into locking engagement with the sector of teeth 24. The locking tab 56, therefore, provides additional support to the cam 60. When the trigger arm 70 is moved to the unlocked position, the trigger arm 70 moves past the locking edge 58. Then, the trigger arm 70 engages the arm 61 of the cam 60 to move the cam 60 into the respective unlocked position against the force applied by the biasing element 64. Thus, the cam 60 moves between the locked and unlocked positions in response to movement of the trigger arm 70 between respective locked and unlocked positions. Alternatively, the pawl 40 can be formed without the locking tab 56 and locking edge 58, as shown in FIG. 5.

A release lever 80 is pivotally assembled to the seat cushion bracket 30 by pivot pin 72 and operatively coupled to the trigger arm 70 to allow manual actuation of the trigger arm 70 between the locked and unlocked positions.

In operation, the angular position of the seat back 12 may be adjusted by rotating the release lever 80 counterclockwise, as viewed in the figures, until the trigger arm 70 and the cam 60 are moved to their respective unlocked positions. In the unlocked position, the cam 60 and the trigger arm 70 are out of engagement with the second cam edge 54 and locking edge 58, respectively, and the pawl 40 is freely moveable between the locked and unlocked positions. The rack of teeth 42 fall out of locking engagement with the sector of teeth 24 to allow pivotal adjustment of the seat back 12 between any one of the reclined seating positions A, B, C. The seat back 12 is locked in one of the seating positions A, B, C by allowing the trigger arm 70, the cam 60, and in turn, the pawl 40, to return to their respective locked positions under the bias of the biasing element 64.

Figure 4:
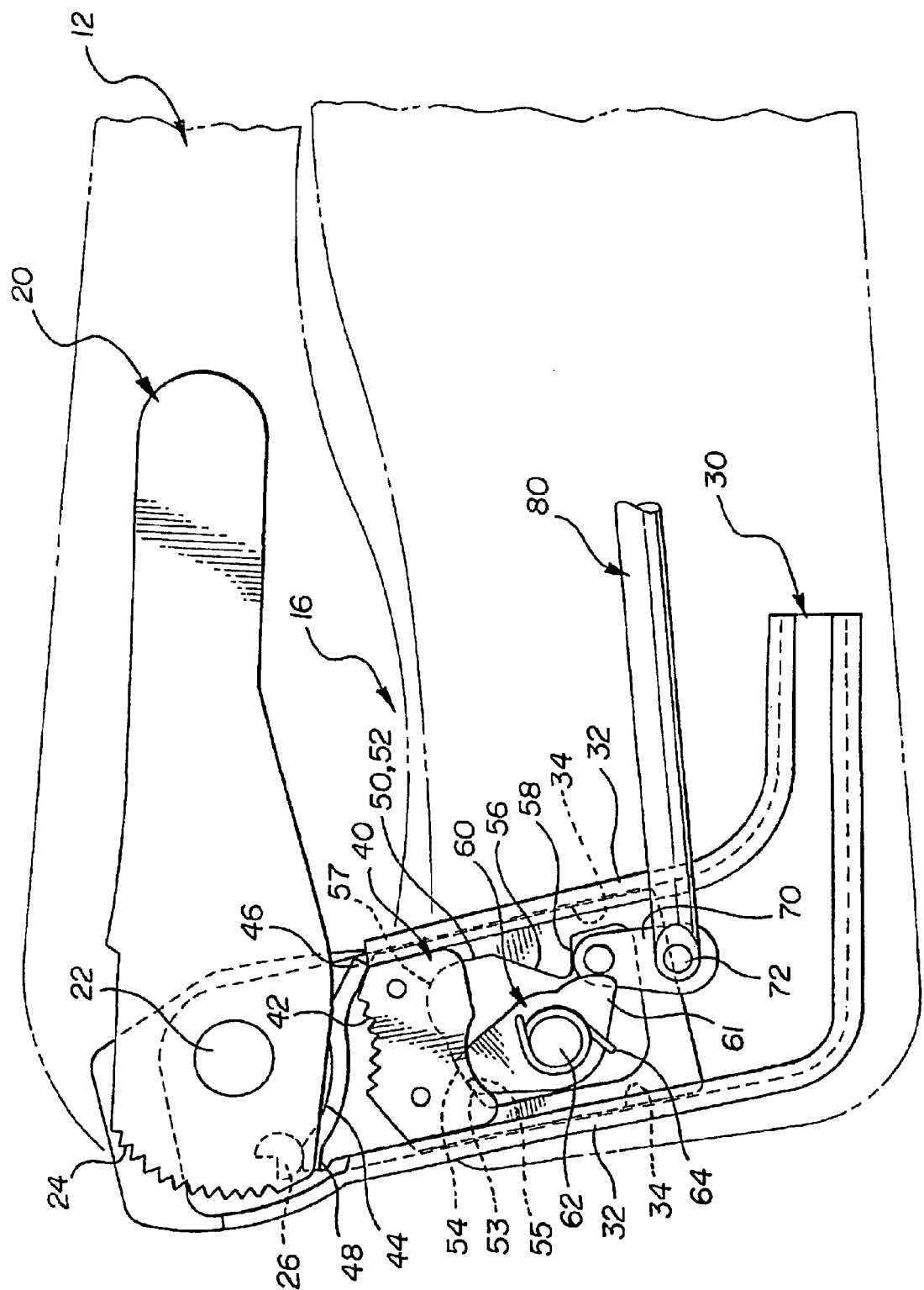
FIG. 4 is a side view of the recliner mechanism shown in the locked position with the seat back in a stowed position.

The seat back 12 may also be adjusted between any of the reclined seating positions A, B, C and the stowed position D, shown in FIG. 4, by moving the pawl 40 to the unlocked position by manual actuation of the release lever 80. As the seat back 12 rotates towards the stowed position D, the guide pin 26 acts upon the first cam edge 44 to force the pawl 40 towards the unlocked position. The guide pin 26, during rotation of the seat back 12 between the full forward reclined seating position C and the stowed position D, maintains the pawl 40 in the unlocked position without further need to maintain the release lever 80 in the position shown in FIG. 3. The rack of teeth 42 are held out of engagement with the sector of teeth 24 to allow rotation of the seatback 12. When the seat back 12 reaches the stowed position D, the guide pin 26 moves past the first cam edge 44 to allow the pawl 40 to move to the locked position and maintain the seat back 12 in the stowed position D. As the pawl 40 moves to the locked position, the aft end 48 abuts against the guide pin 26.

The seat back 12 may be returned to the full forward reclined seating position C from the stowed position D by actuating the release lever 80 to move the pawl 40 to the unlocked position. The pawl 40 is held in the unlocked position by the guide pin 26 while the seat back 12 is moved between the stowed position D and the full forward reclined seating position C. When the seat back 12 reaches the full forward reclined seating position C, the guide pin 26 slides past the first cam edge 44 to allow the pawl 40 to return to the locked position and maintain the seat back 12 in the full forward reclined seating position C. As the pawl moves to the locked position, the fore end 46 abuts against the guide pin 26.

The seat back 12 may then be pivotally adjusted between any one of the reclined seating positions A, B, C, or the stowed position D as desired, as described above.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner mechanism for a seat assembly of an automotive vehicle for allowing pivotal adjustment of a seat back relative to a seat cushion, said recliner mechanism comprising:

a seat back bracket adapted to be fixedly secured to the seat back and having a sector of teeth;

a seat cushion bracket adapted to be fixedly secured to the seat cushion, said seat cushion bracket pivotally assembled to said seat back bracket for movement of said seat back bracket relative to said seat cushion bracket between a plurality of seating positions, said seat cushion bracket having spaced apart guide walls defining a channel therebetween; and a pawl having a rack of teeth lockably engagable with said sector of teeth, said pawl slidably engaged within said channel for movement between a locked position with said rack of teeth lockably engaged with said sector of teeth to maintain the angular position of the seat back bracket relative to the seat cushion bracket and an unlocked position with said rack of teeth disengaged from said sector of teeth to allow pivotal movement of said seat back bracket relative to said seat cushion bracket between said plurality of seating positions, said pawl including a first cam edge having a raised profile slidably engagable with a portion of said seat back bracket for maintaining said pawl in said unlocked position during movement of said seat back bracket between said plurality of seating positions.

2. A recliner mechanism as set forth in claim 1 wherein said seat back bracket includes a guide pin slidably engagably with said raised profile of said first cam edge for maintaining said pawl in said unlocked position during movement of said seat back bracket between said plurality of seating positions and a forwardly stowed position.

3. A recliner mechanism as set forth in claim 2 including a cam operatively engaged with said pawl and pivotally assembled to said seat cushion bracket for selective movement between a locked position engaged with said pawl to maintain said pawl in said respective locked position and an unlocked position to allow movement of said pawl out of engagement with said sector of teeth for pivotal movement of said seat back bracket.

4. A recliner mechanism as set forth in claim 3 wherein said pawl includes an opening defined by a peripheral edge for receiving said cam therein, said peripheral edge presenting a second cam edge having a curved profile for engagement with said cam during movement between said locked and unlocked positions.

5. A recliner mechanism as set forth in claim 4 wherein said second cam edge includes a raised portion engagable with said cam to maintain said pawl in said locked position.

6. A recliner mechanism as set forth in claim 5 wherein said second cam edge includes a concave portion for receiving said cam therein while in said unlocked position and for allowing said pawl to fall out of engagement with said sector of teeth.

7. A recliner mechanism as set forth in claim 6 wherein said second cam edge includes a plurality of concavities formed therein to minimize friction between said second cam edge and said cam.

8. A recliner mechanism as set forth in claim 7 including a trigger arm pivotally assembled to said seat cushion bracket for engaging and forcing said cam between said locked and unlocked positions.

9. A recliner mechanism as set forth in claim 8 wherein said pawl includes a locking tab projecting from said peripheral edge and presenting a locking edge engagable with said trigger arm to maintain said pawl in said locked position.

10. A recliner mechanism as set forth in claim 9 including a biasing element for biasing said cam towards said locked position.

\* \* \* \* \*